UNITED STATES PATENT OFFICE.

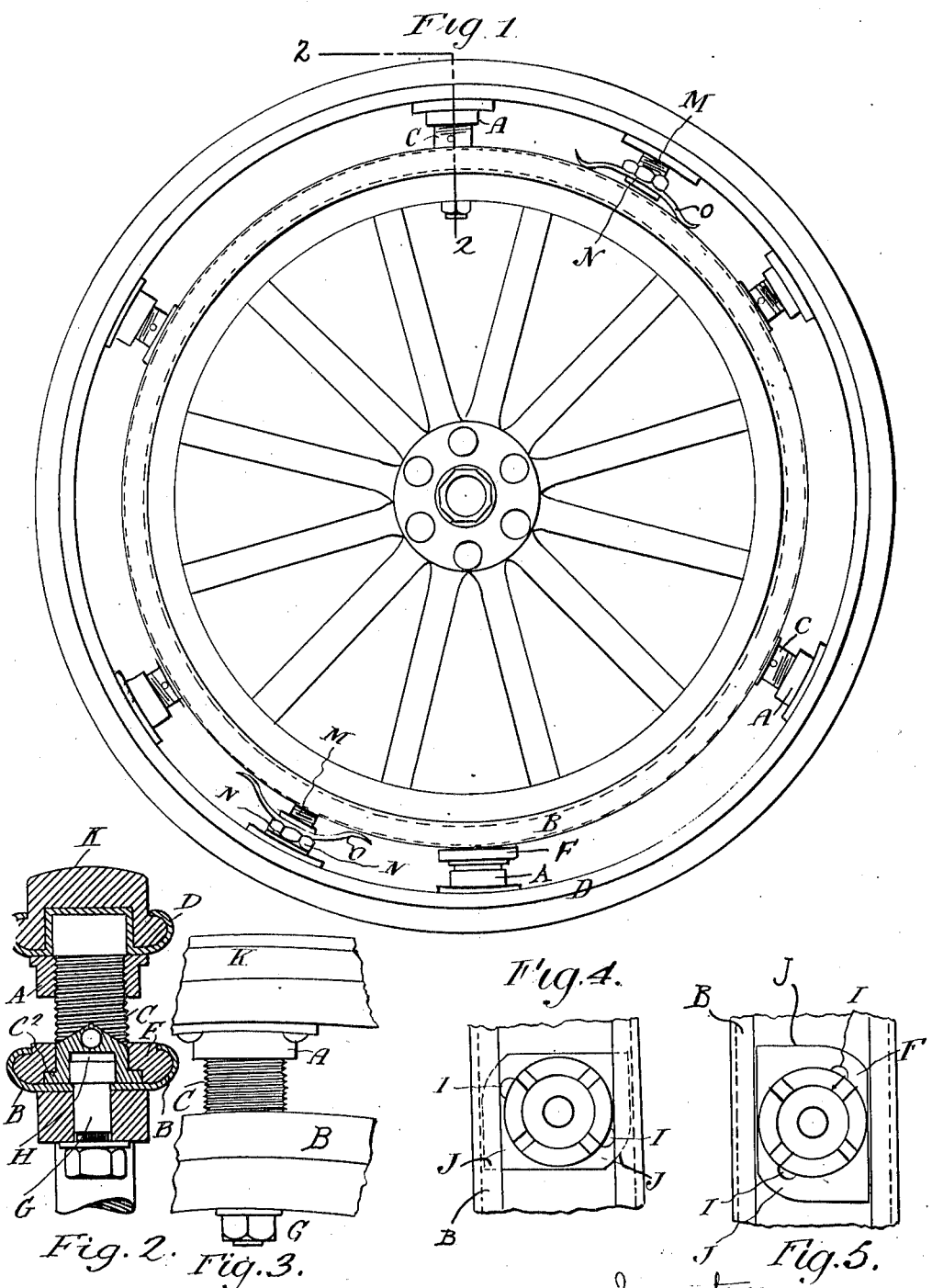

ALEXANDER TURNBULL, OF GLASGOW, SCOTLAND.

EMERGENCY-RIM FOR VEHICLE-WHEELS.

1,088,747.  Specification of Letters Patent.  Patented Mar. 3, 1914.

Application filed November 15, 1910. Serial No. 592,545.

*To all whom it may concern:*

Be it known that I, ALEXANDER TURNBULL, of the firm of Alex. Turnbull & Co. Ltd., of St. Mungo street, Bishopbriggs, Glasgow, Scotland, have invented certain new and useful Improvements in Emergency-Rims for Vehicle-Wheels, of which the following is a specification.

My invention relates to improvements in emergency rims for vehicle wheels and consists in the construction of the rim and a means of fixing same to the wheel of a motor car or other vehicle, after the removal of the ordinary tire which may have become damaged and a means of preventing creeping or side play between the emergency rim and the wheel of the motor car so that the extreme diameter of my emergency rim when applied to the motor or other vehicle wheel will be practically equal to that of the vehicle wheel before being damaged.

In order that my invention may be properly understood and readily carried into effect, I have hereunto appended drawing wherein—

Figure 1 is a front view of a vehicle wheel illustrating one method of attaching my emergency rim thereto; Fig. 2 is a part section along line 2—2 of Fig. 1 in larger scale; Fig. 3 is a part front view in larger scale of Figs. 1 and 2; Fig. 4 a plan view of Fig. 3 looking down, but with the emergency rim and male member removed and showing locking washer interlocking with the wheel rim; Fig. 5 a similar view to Fig. 4 with the locking washer in unlocked position.

In carrying out my invention as applied to a motor car wheel, after the removal of the damaged tire, I provide a rim D of slightly larger diameter than the rim B of the car wheel and on which is carried any suitable tire or tread, but preferably one of an elastic nature and whose extreme diameter is practically equal to the diameter of the car wheel and penumatic or other tire before being damaged.

In the space between the rim D and the car wheel rim B are arranged six or other number of devices which act as struts and ties consisting of two members which are screwed male and female, and are adjustable lengthwise to said space between the two rims, said rims being at the time concentric with each other, one end of said struts and ties, being made to fill the space between the inner edges of the car wheel rim, so as to prevent any side play between the auxiliary and car wheel rims.

The struts and ties may be of varied designs according to the desired mode of attachment. In the figures one member of the strut and tie is riveted or otherwise fixed to the auxiliary rim, and it will be seen that the female member A of the strut and tie is riveted or otherwise fixed to the rim D, carrying the tire K, while the male member C has a projection C² at its lower end so that it may be freely turned in a hole or recess in the locking washer F, shown more particularly in Fig. 2, the said washer F being so formed that it can be readily dropped in between the inner edge of the rim B of the wheel of the car or other vehicle and lifted out, but when turned by means of a spanner through 90° so that the extensions J of the washer F lie under the rim and the projections I cause the rim to be slightly forced apart until turned past the center line, and consequently becomes locked with the turned in edges of the car wheel rim until the spanner is again used to release the same, as seen more particularly in Figs. 4 and 5. In this arrangement it will be seen that the construction enables the device to act both as a strut and a tie between the two rims D and B. The lower half of Fig. 1 shows more particularly the position of the emergency rim just after having been slipped over the rim of the vehicle wheel and ready for attachment while the upper half shows the position of the emergency rim after being attached to the vehicle wheel rim. To prevent creeping of the emergency rim around the vehicle wheel, I provide a pin or bolt G which may be inserted into or through the usual air valve hole in the vehicle wheel, as shown more particularly in Fig. 2, the upper head or end of said pin G entering into a recess H at the bottom end of strut and tie, as shown in Fig. 2.

I claim:

1. In an emergency wheel for vehicles comprising a rim of larger diameter than the rim of the wheel proper, a plurality of supports permanently carried by said emergency rim; each of said supports consisting of three members, one of said members being rigidly connected to the inner periphery of the emergency rim, the second member adapted to engage between the beads of the main rim when in locking position and to be disengaged from said main rim when turned approximately 90° relative to said position; the third member being a bolt having threaded connection with the first member and being provided with an enlarged flange at its inner end, and a circular recess in said second member for engaging with said flange, and means on said third member for revolving it relative to the other two members.

2. In an emergency wheel for vehicles comprising a rim of larger diameter than the rim of the wheel proper, a plurality of supports permanently carried by said emergency rim; each of said supports consisting of three members, one of said members being rigidly connected to the inner periphery of the emergency rim, the second member adapted to engage between the beads of the main rim; the third member being constructed to engage directly with the two other members in order to hold them rigidly and permanently together and to adjust the distance between them, said third member having threaded connection with said first member.

In testimony whereof I affix my signature in presence of two witnesses.

ALEXANDER TURNBULL.

Witnesses:
 JOHN LIDDLE,
 JOHN TRAIN LIDDLE.